US006928417B1

(12) United States Patent
Sundaresan

(10) Patent No.: US 6,928,417 B1
(45) Date of Patent: Aug. 9, 2005

(54) METHOD, SYSTEM, AND COMPUTER-READABLE MEDIUM FOR AN ELECTRONIC STORE ASSISTANT

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 09/672,305

(22) Filed: Sep. 29, 2000

(51) Int. Cl.[7] .............................................. G06F 17/60
(52) U.S. Cl. ....................................................... 705/26
(58) Field of Search ................................... 705/26, 27

(56) References Cited

U.S. PATENT DOCUMENTS

| | | | | |
|---|---|---|---|---|
| 5,235,509 A | * | 8/1993 | Mueller et al. | 705/15 |
| 5,353,219 A | * | 10/1994 | Mueller et al. | 705/16 |
| 6,014,639 A | * | 1/2000 | Fohn et al. | 705/27 |
| 6,070,149 A | * | 5/2000 | Tavor et al. | 705/26 |
| 6,489,968 B1 | * | 12/2002 | Ortega et al. | 345/713 |

FOREIGN PATENT DOCUMENTS

WO WO 97/49030 * 6/1996 ........... G06F 17/60

OTHER PUBLICATIONS

"NetRep", as described in the articles "Online Stories Hope Shoppers Aye to Watchful Assistants" (Marriott, Michel. Feb. 20, 2000. Sun Sentinel).*
"Internet's First Online Salesperson Technology Offered by icontact.com, Inc." (Press Release, Feb.*
"Online Stories Hope Shoppers say Aye to Watchful Assistants" (Marriott, Michel. Feb. 20, 2000. Sun Sentinal).*
"Internet's First Online Salesperson Technology Offered by icontact.com, Inc." (Press Release, Feb. 16, 2000).*
The Learning Company, "Press Release: New Software Products from The Learning Company", Apr. 26, 1999, pp. 1-4.
Sarah Varney, "Link Your Help Desk to the Web", Datamation, May 15, 1996, pp. 1-6).
Eddison Describes Future Help Desks (Datamation May 15, 1996), http:/www.datamation.com/PlugIn/issues/ . . . 15/EddisonDescribesFutureHelpDesks7.ht, pp. 1-3.
Jakob Nielsen, "Alertbox for Dec. 27, 1998:", Alertbox, Dec. 27, 1998, pp. 1-4.
Priceline.com Investor Relations, "For the First Time, Consumers Can Use the Power of the Internet to Name Their Own Price for Major Purchases", http://www.corporate-ir.net/ireye/ir_sit r=pcln&script=410&layout=7&item_id=239:, pp. 1-2.
Rob Turner, "Bots that shop 'till the prices drop", Money.com, Apr. 30, 1999, pp. 1-3.
About Compare.Net, http://www.compare.net/companyinfo/about.p3?sid=250322271&mode, pp. 1-2.

* cited by examiner

Primary Examiner—Jeffrey A. Smith
Assistant Examiner—Matthew S Gart
(74) Attorney, Agent, or Firm—Mark McCabe, Esq.; McGinn & Gibb, PLLC

(57) ABSTRACT

A method and system for conducting electronic commerce, includes browsing, by a user, for an item over an electronic medium, recognizing that the user is lost in attempting to find the item, and interactively querying, at any time during a session, the user whether the user needs help in finding the item.

16 Claims, 3 Drawing Sheets

METHOD, SYSTEM, AND COMPUTER-READABLE MEDIUM FOR AN ELECTRONIC STORE ASSISTANT

BACKGROUND OF THE INVENTION

1. Field of the Invention

The present invention relates to a system and method of electronic commerce ("e-commerce"), and more particularly to a system and method for bringing an electronic shopping experience closer to a "normal" (e.g., traditional) shopping experience by defining an "electronic store assistant" (hereafter, an "e-Store assistant") which helps electronic shoppers who are "lost" while browsing for an item (e.g., a product or service) in an electronic commerce (e-commerce) site.

2. Description of the Related Art

As increasing numbers of people use computers for shopping through e-commerce stores, these stores would be expected to allow the users to provide facilities that bring them closer to a normal shopping experience. However, this has not been the case.

Presently, the conventional systems merely provide electronic shopping carts where the user adds purchased items, and express check-outs where the user may leave the e-commerce site at the earliest time if the orders are small and fixed.

However, there are few other features which bring the electronic shopping experience closer to a normal, traditional shopping experience. Indeed, there has not been provided (nor the advantages recognized) of allowing an e-store assistant to help a user who is lost while shopping.

Typical e-stores have shopping aisles which are basically categories. These categories are further divided up into subcategories and so on. However, the names of the categories may not be exactly representative of all the items that are found in each category. This is a problem and leads to inefficiency and frustration for the user.

For instance, there may be a category that indicates "Baking Needs" and another category that indicates "Tea and Coffee". The user who is looking for "Brown Sugar" may wander into the wrong category without knowing which of these areas should (or is) actually be carrying "Brown Sugar". Further, the user might be looking for "Glucose powder" which could be in any of these categories, or may be in a totally different category (e.g., "Health Foods").

Another problem is that the user may not have an exact description of the product. This may cause the user to go to each aisle that the user thinks is related to it and try to search for it. This is very inefficient for the user.

For instance, the user might be looking for a light bulb that will fit a particular electrical fitting. If the user is shopping in a specialized electrical store, the user might go into different categories of electrical fittings, and appliances, and type in words like "bulb", "halogen", and so on. However, there is no guarantee that the user will be able to find the item.

Further, it is noted that the Microsoft Word® program has the notion of a static assistant which keeps track of the input typed in a Word document and provides tips. However, this does not work in an e-commerce environment. Along these lines, it is noted that most e-commerce sites have "Help" facilities, but do not provide a dynamic shopping assistant. Any "help" is provided in a static, predetermined manner.

Thus, hitherto the present invention, there has been no feature to help the user to efficiently find the item (e.g., product or service) desired by the user. As a result, an inefficient shopping session results. That is, prior to the present invention, there have been few facilities for bringing electronic shopping experience closer to a normal shopping experience, and none which have allowed an e-store assistant to help a user who is lost while shopping.

SUMMARY OF THE INVENTION

In view of the foregoing and other problems, disadvantages, and drawbacks of the conventional methods and structures, an object of the present invention is to provide a method and structure in which an "e-store assistant" automatically (or on-demand) determines whether a visitor (user) to an e-commerce site is "lost" in looking for an item in the store, and in which the e-store assistant helps the visitor out.

In a first aspect of the present invention, a method (and system) for conducting electronic commerce, includes browsing, by a user, for an item over an electronic medium, recognizing that the user is lost in attempting to find the item, and interactively querying, at any time during a session, the user whether the user needs help in finding the item.

In a second aspect of the present invention, a method of conducting electronic commerce, includes electronically browsing, by a user, an electronic store, the store automatically registering the user with an electronic store assistant, navigating, by the user, the electronic store, tracking the user's inputs including any of requests, queries, and clicks made by the user, determining whether the user seems lost based on the tracking of the user's inputs, and launching, by the electronic store assistant, a help resource for asking the user whether the assistant can be of some help for the user.

In a third aspect of the present invention, a method of providing help in an electronic commerce transaction, includes browsing an electronic store by a user for an item by navigating to a hierarchy of categories, based on the navigating, judging whether a user is lost in attempting to find the item, and based on the judging, interacting with the user to provide help to the user in finding the item sought.

With the unique and unobvious aspects and features of the present invention, shopping aisle categories are decided a-priori by the e-store system as to what kind of items go into each category and sub-category and so on. When the user ends up in a wrong category and types in a word or a phrase of an item that belongs to a different category, the system detects such an occurrence, and the electronic shopping assistant directs the visitor to the right category in which the visitor can find the item.

In another aspect of the present invention, if the user does not have an exact description of the product, the system accumulates the search requests and checks them against the abstract describing each of the aisles and automatically directs the user to one or a couple of aisles where the item may be found.

In another aspect of the present invention, if the user is searching for an item by going from category to category or category to subcategory (e.g., audio equipment, to CD players, to car stereos, to speakers, etc.) without picking any item, the system determines (speculates) that the user has been browsing the aisles related to audio equipment but has not specified any particular requirement. In this case, the system can direct such a user to a real human being in the store who is an expert in "audio stuff". This expert can set up a chat session with the user, and can ask the user what he or she would be interested in and gives some advice on such a thing.

Thus, an e-store assistant according to the invention, is different from a general "Help" or "tips" or "search" or "FAQ" mechanism available on web sites where the user has to explicitly go to the "Help" facility and look for information on what the user is looking for. In addition, the information provided by these facilities is "static" in nature.

Browsing an electronic store is much more complex than general browsing of the web because the user is looking for specific items and the items are typically pre-categorized. In a complex e-store, users can become lost browsing as they are looking for a particular item. Different e-stores have different styles of categorizing (similar to a regular store) based on manufacturer, product type, etc. An e-store assistant will monitor the mouse clicks or queries typed in by the user to see if a user is lost and if so will automatically come to help the user.

An e-store assistant typically keeps track of shopper navigational behaviors and previous-visit histories in its database by logging the user's texts and queries typed in and mouse clicks over the clickable items (like hyperlinks) corresponding to the different items, categories and aisles in the e-store.

In the invention, as the e-shopper browses over different categories, comes back to the same category, issues a lot of query requests of related terms and seems dissatisfied (e.g., this is discovered because the shopper does not pick an item to buy from the search results), the e-store assistant can be launched, activated, and can ask the shopper "May I help you?". This would be an advantageous alternative to having to call the 1-800 number of the e-store site for better information, especially given that many users typically share a telephone line between their computer and their voice communications thereby requiring a user to end their shopping session and go off-line to make such a call.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED

Embodiments of the Invention

Figure 1:
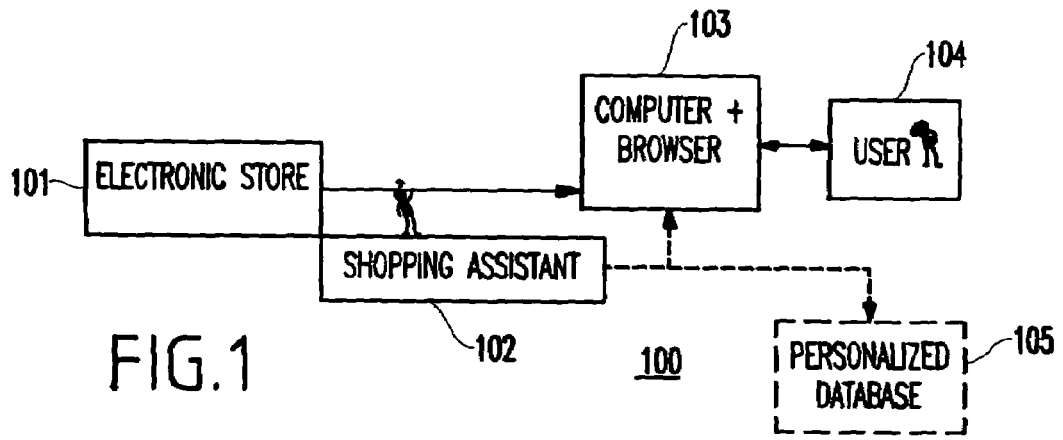
FIG. 1 illustrates a schematic block diagram of a system 100 according to the present invention.

Referring now to the drawings, and more particularly to FIGS. 1–5, there are shown preferred embodiments of the method and structures according to the present invention.

FIG. 1 illustrates an environment and system 100 for use in the environment of the present invention for an electronic shopping experience.

As shown in FIG. 1, the system 100 includes an electronic store 101, a shopping assistant 102, and a computer (and browser installed thereon) 103 for access by a user 104.

Optionally, the system 100 may include a personalized database 105 unique to the user and which may be activated when the user logs onto the system (e.g., the personalized database keeps information particular to the user, his buying habits, clicking habits, navigational approach, the items the user browses for and then eventually purchases, etc.).

The shopping assistant 102 may be implemented in software as a program (or search window) which is activated based on a query or which can be activated automatically after a predetermined number of navigations/mouse clicks. Moreover, the assistant 102 could simply be a software dialer which dials up a telephone number of a customer support center.

Basically, the assistant takes the history of the browser based on the query that the user has typed in, determines whether the user is lost, and then routes it to the right (relevant) kind of software (or calls an external help facility) to help the user.

Figure 2:
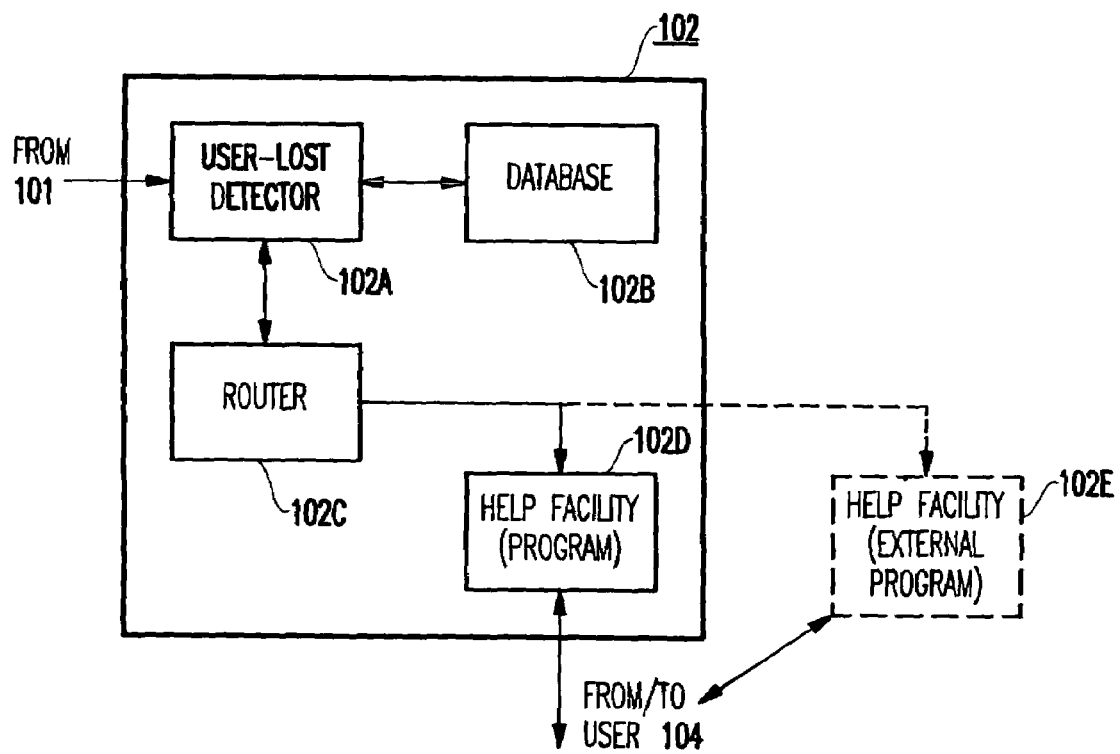
FIG. 2 schematically illustrates a block diagram of the shopping assistant according to the present invention.

FIG. 2 illustrates the shopping assistant in greater detail including a user-lost detector 102A for detecting whether the user appears lost, a database 102B for being accessed by the user-lost detector to assist in determining whether the user is lost, a router 102C for routing the user for access (e.g., launching the user) to either an internal help facility 102D or an external (e.g., external to the system) help facility 102E. The help facility may include a live person, a chat program, etc. Database 102B may be same as personalized database 105 in FIG. 1 but in addition may be a general purpose database of information about how the store is organized, containing store specific information, information about other users, whether the user has been e-assisted before and the user's own browsing and buying patterns, etc.

Figure 3:
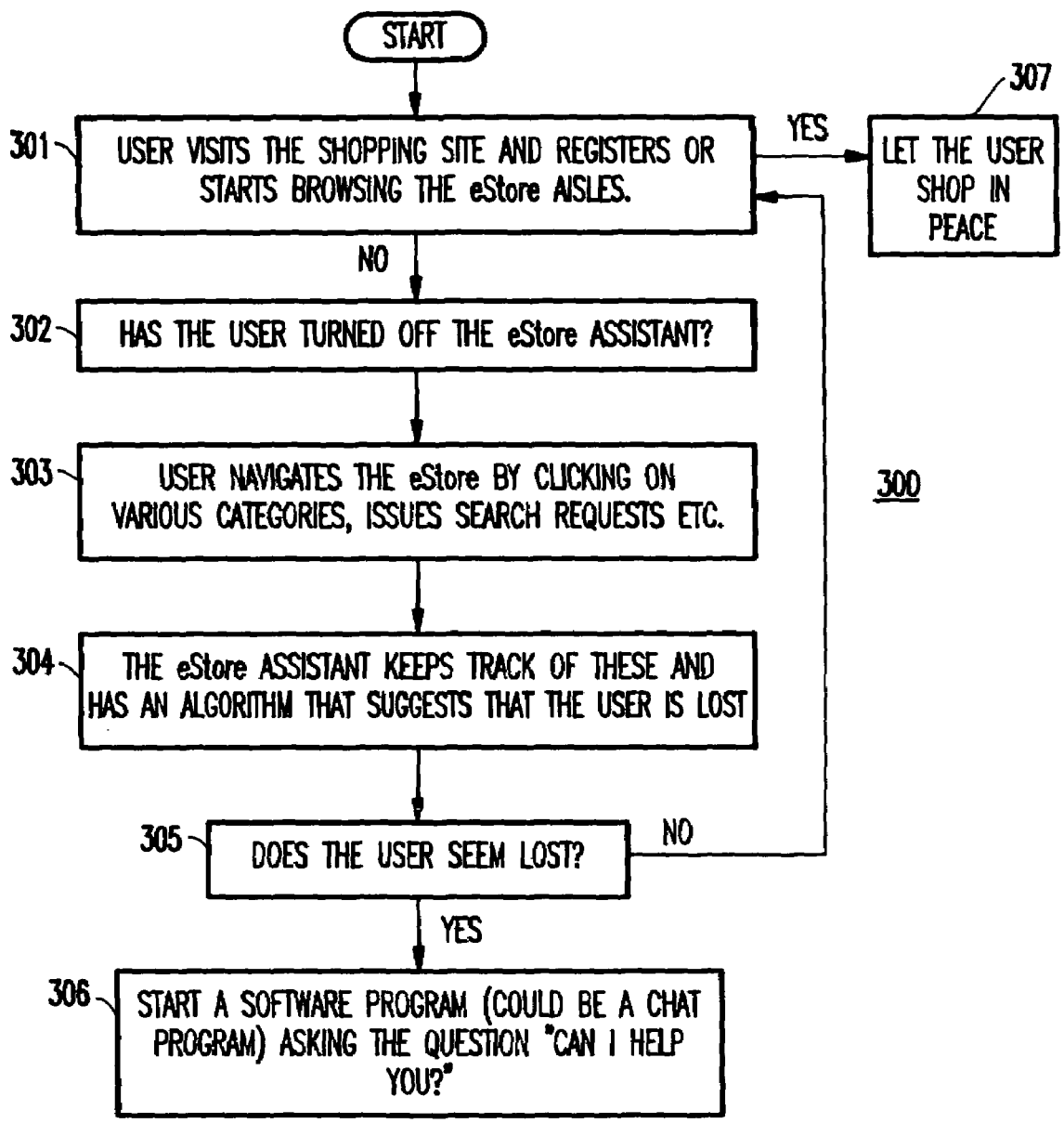
FIG. 3 illustrates a method 300 of detecting whether a user is lost while conducting an electronic shopping session.
Figure 5:
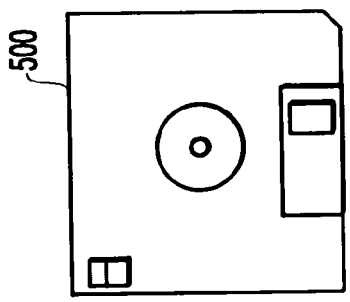
FIG. 5 illustrates a signal bearing medium 500 (e.g., storage medium) for storing steps of a program of the method 300 according to the present invention.

Turning to FIG. 3 which illustrates the method 300 of the invention, in operation, in step 301 the user 104 visits (e.g., comes into) the e-store 101 and starts browsing. As the user registers, the store registers the user with the e-store assistant.

In step 302, it is determined whether the user has turned off the e-Store assistant. If "YES", then the process exits to step 307 and the user is allowed to shop without any external input/help. If "NO", the process continues to steps 303 and 304.

In step 303, the user navigates the e-Store by clicking on various categories and issues search requests, etc.

In step 304, as the user types in requests, queries, clicks, etc., the system keeps track of the inputs.

In step 305, it is determined whether the user seems lost based on predetermined criteria set-up in advance by the system.

That is, when the store assistant software agent is sufficiently convinced (based on a predetermined algorithm or criteria) (e.g., similar queries were typed in, or the same categories were visited or too many related categories were visited) that the user is lost, the process continues to step 306. If the determination in step 305 is "NO", then the process loops back to step 302 to determine whether the user has turned off the e-Store assistant.

Assuming a "YES" in step 305, the process continues to step 306 in which the e-store assistant comes onto the browser and either starts a software program (or requests a chat session or a similar interactive program) and asks the user whether the assistant may be of some help in finding the product or service for the user.

As mentioned above, the user may optionally turn off the agent or refuse to participate in a chat session. If the user does participate, then a dialog is established between the user and the agent in step 306.

It is noted that, with the unique and unobvious aspects and features of the present invention, shopping aisle categories can be decided "a-priori" by the e-store system as to what kind of items go into each category and sub-category and so on. When the user travels to a wrong category and types in a word or a phrase of an item that belongs to a different category, the system can detect such an occurrence (e.g., by comparison with the information held in database 102B), and the electronic shopping assistant points the visitor to the right category in which the visitor can find the item by internally passing the user queries through categories that the user has not visited and checking if the item that the user is looking for belongs to any of those categories. For instance, for a user looking for "light bulbs" in the "household item" categories, the system can run the same query against "hardware" or "electrical" category either based upon the fact that these two categories are related somehow or based upon the fact that the user has often visited the "electrical" category. If no such information can be drawn, the system can do an exhaustive search.

It is noted that the user may be proactive in asking for help or passive. That is, in a proactive mode, the user may detect he/she is lost or otherwise and goes immediately to the assistant and asks for help. Alternatively, the system (assistant) may recognize the user is lost and automatically generate a query window asking the user if he/she desires some help.

In another aspect of the present invention, if the user does not have an exact description of the product, then the system accumulates the search requests and checks them against the abstract describing each of the aisles and automatically directs the user to one or more aisles where the item may be found by searching a database of product descriptions and synonyms. For instance, a person may look for a product by its brand name, or by what it is popularly known by, or by a similar name. That is, instead of "Detergent", the user may type in "washing soap" or "Tide".

In another aspect of the present invention, if the user is searching for an item by going from category to category or category to subcategory (e.g., audio equipment, to CD players, to car stereos, to speakers, etc.) without picking any item, the system figures that the user has been browsing the aisles related to audio equipment, but has not specified any particular requirement. In this case, the system can direct such a user to a real human being in the store who is an expert in "audio stuff". This expert can set up a chat session with the user, and asks the user what he or she would be interested in and gives some advice on such a thing.

As mentioned above, the inventive e-store assistant is different from a general "help" or "tips" or "search" or "FAQ" mechanism available on web sites where the user has to explicitly go to the "Help" facility and look for information on what the user is looking for. In addition, the information provided by these facilities is "static" or fixed in nature. Frequently asked questions are fixed and are updated infrequently and are typically too general in nature.

An e-store assistant typically keeps track of shopper navigational behaviors and previous-visit histories in its (optional) personalized database 105.

As the e-shopper browses over different categories, comes back to the same category, issues a lot of query requests of related terms and seems dissatisfied (e.g., this is discovered because the shopper does not pick an item to buy from the search results), the e-store assistant can activate, and asks the shopper "May I help you?".

Along with the methods above, a lost user can be detected easily by the invention. That is, all e-Stores have a search interface where the user can look for product information. If the user repeatedly types in new search words on the search windows, this would indicate being lost. Obviously, other criteria or indicia of "being lost" could be used. The e-Store assist engine can keep track of the words typed in and if the number of searches tried by the user exceeds some threshold the system can automatically activate the e-Store assistant.

Further, the business prospects of the e-commerce site are improved as it attracts more shoppers looking for a real shopping experience, and makes for a pleasant shopping experience where shoppers get free advice and do not waste time looking for things in an e-Store.

Thus, with the unique and unobvious features of the present invention, a facility is provided which brings the shopping experience closer to a normal, traditional shopping experience by allowing an e-Store assistant to help a lost shopper.

Figure 4:
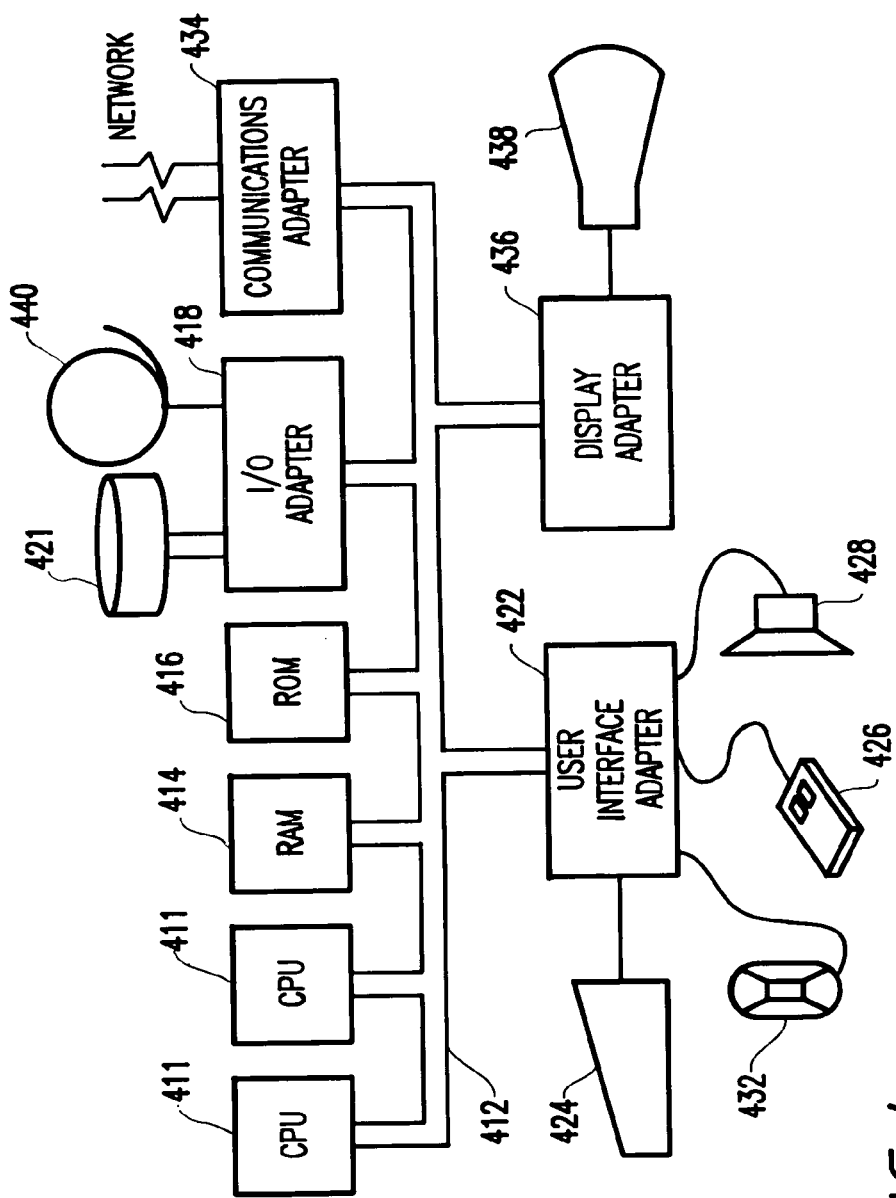
FIG. 4 illustrates an exemplary hardware/information handling system 400 for incorporating the present invention therein.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While a preferred embodiment of the present invention has been described above, it should be understood that it has been provided as an example only. Thus, those skilled in the art will recognize that the invention can be practiced with modification within the spirit and scope of the appended claims.

What is claimed is:

1. A method for conducting electronic commerce, comprising:
    browsing, by a user, for an item at an electronic store (e-Store) over an electronic medium;
    automatically recognizing, without human intervention, that the user is lost in attempting to find said item; and
    interactively querying by an electronic store assistant, at any time during a session, of said user whether the user needs help in finding said item,
    wherein said electronic store assistant is implemented in software as one of a program and a search window which is activated based on one of a query and activated automatically after a predetermined number of navigations by said user,
    wherein said automatically recognizing, without human intervention, comprises:
        considering a history of the browser based on said query entered in said browsing by said user;
        determining, based on said history and said query, whether an automated help resource is necessary;
        determining, based on said history and said query, whether a human help resource is necessary; and
        routing said user to at least one of said automated help resource and said human help resource, to help said user.

2. The method of claim 1, further comprising:
    logging into a computer system by the user.

3. The method of claim 1, wherein said browsing comprises navigating through a hierarchy of categories.

4. The method of claim 1, wherein said recognizing includes detecting by an e-Store assistant that the user is lost, said querying being performed by said e-Store assistant.

5. The method of claim 1, wherein said recognizing includes said user recognizing that the user is lost and said user requesting help from an e-Store assistant.

6. The method of claim 5, wherein said e-Store assistant comprises a software dialer which dials up a telephone number of a customer support center.

7. The method of claim 1, further comprising:
    considering the history of the browser based on a query that said user has typed in;
    determining whether the user is lost; and
    routing said user to a help resource to help the user.

8. The method of claim 7, wherein said help resource comprises one of a live person and a chat program.

9. A system for performing electronic commerce, comprising:
    means for browsing, by a user, for an item at an electronic store (e-Store) over an electronic medium;
    means for automatically recognizing, without human intervention, that the user is lost in attempting to find said item; and
    means for interactively querying, at any time during a session, of said user whether the user needs help in finding said item,
    wherein said means for automatically recognizing comprises:
        means for considering a history of the browser based on a query entered in said browsing by a user;
        means for determining based on said history and said query, whether an automated help resource is necessary;
        means for determining, based on said history and said query, whether a human help resource is necessary; and
        means for routing said user to at least one of said automated help resource and said human help resource, to help said user.

10. A computer-readable medium tangibly embodying a program of machine-readable instructions executable by a digital processing apparatus to perform a method of conducting electronic commerce, said method comprising:
    browsing, by a user, for an item at an electronic store (e-Store) over an electronic medium;
    automatically recognizing, without human intervention, that the user is lost in attempting to find said item; and
    interactively querying, at any time during a session, of said user whether the user needs help in finding said item,
    wherein said automatically recognizing comprises:
        considering a history of the browser based on a query entered in said browsing by a user;
        determining, based on said history and said query, whether an automated help resource is necessary;
        determining, based on said history and said query, whether a human help resource is necessary; and
        routing said user to at least one of said automated help resource and said human help resource, to help said user.

11. A method for conducting electronic commerce, comprising:
    browsing for an item at an electronic store (e-Store) over an electronic medium;
    automatically recognizing, without human intervention, that the user is lost in attempting to find said item; and
    interactively querying, at any time during a session, of said user whether the user needs help in finding said items,
    wherein said automatically recognizing comprises:
        considering a history of the browser based on a query entered in said browsing by a user,
        determining, based on said history and said query, whether an automated help resource is necessary;
        determining, based on said history and said query, whether a human help resource is necessary; and
        routine said user to at least one of said automated help resource and said human help resource, to help said user.

12. The method of claim 11, wherein said automated help resource comprises a help source that automatically assists said user without human intervention.

13. A method for conducting electronic commerce, comprising:
    browsing, by a user, for an item at an electronic store (e-Store) over an electronic medium;
    automatically considering, without human intervention, a history of said browser based on a query entered in said browsing by said user;
    automatically determining, without human intervention, based on said history and said query, whether an automated help resource should be launched;

automatically determining, without human intervention, based on said history and said query, whether a human help resource should be contacted;

automatically routing, without human intervention, said user to at least one of said automated help resource and said human help resource, to help said user.

14. The method of claim 13, wherein said automated help resource comprises a help source that automatically assists said user without human intervention.

15. The method of claim 14, wherein said automated help resource interactively queries, at any time during a session, said user whether the user needs assistance with said browsing.

16. The method of claim 13, wherein said human help resource interactively queries, at any time during a session, said user whether the user needs assistance with said browsing.

* * * * *

Disclaimer

6,928,417 — Neelakantan Sundaresan, San Jose, CA (US). METHOD, SYSTEM, AND COMPUTER-READABLE MEDIUM FOR AN ELECTRONIC STORE ASSISTANT. Patent dated August 9, 2005. Disclaimer filed October 6, 2006, by the assignee, International Business Machines Corporation.

Hereby enters this disclaimer to all of the claims, of said patent.

*(Official Gazette, May 27, 2008)*